United States Patent
Suzuki et al.

(10) Patent No.: US 10,578,162 B2
(45) Date of Patent: Mar. 3, 2020

(54) BEARING RING FOR ROLLER BEARING, METHOD FOR MANUFACTURING THE SAME, AND ROLLER BEARING

(71) Applicant: JTEKT CORPORATION, Osaka-shi, Osaka (JP)

(72) Inventors: Kensuke Suzuki, Kashiwara (JP); Wataru Yoshida, Kashiba (JP); Nicolas Vincent Barbi, Kashiba (JP); Tsuyoshi Mikami, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/088,560

(22) PCT Filed: Apr. 4, 2017

(86) PCT No.: PCT/JP2017/014073
§ 371 (c)(1),
(2) Date: Sep. 26, 2018

(87) PCT Pub. No.: WO2017/175756
PCT Pub. Date: Oct. 12, 2017

(65) Prior Publication Data
US 2019/0107152 A1    Apr. 11, 2019

(30) Foreign Application Priority Data

Apr. 5, 2016 (JP) .................................. 2016-075753

(51) Int. Cl.
*F16C 33/64*     (2006.01)
*C21D 9/40*     (2006.01)
(Continued)

(52) U.S. Cl.
CPC ................ *F16C 33/64* (2013.01); *C21D 1/18* (2013.01); *C21D 1/64* (2013.01); *C21D 1/667* (2013.01);
(Continued)

(58) Field of Classification Search
CPC ........ F16C 19/44; F16C 19/46; F16C 19/466; F16C 33/583; F16C 33/585; F16C 33/586;
(Continued)

(56) References Cited

U.S. PATENT DOCUMENTS 6,585,834 B1    7/2003  Kapaan et al.
9,709,099 B2 *  7/2017  Yoshida ................. F16C 33/62
(Continued)

FOREIGN PATENT DOCUMENTS

CN    102362000 A    2/2012
CN    103459617 A    12/2013
(Continued)

OTHER PUBLICATIONS

Jul. 11, 2017 International Search Report issued in International Patent Application No. PCT/JP2017/014073.
(Continued)

*Primary Examiner* — James Pilkington
(74) *Attorney, Agent, or Firm* — Oliff PLC

(57) ABSTRACT

A bearing ring for a roller bearing includes: an inner layer part that is formed of tempering martensite or sorbite; and a surface layer part that surrounds the entire periphery of the inner layer part, in which Vickers hardness of a surface thereof is larger than that of the inner layer, and which is formed of tempering martensite. A raceway portion of the surface layer part a portion that is in contact with at least one end of the rolling contact surface of the roller in an axial direction, and includes a first raceway portion at which (Continued)

compressive residual stress of the raceway surface is relatively high.

5 Claims, 11 Drawing Sheets

(51) Int. Cl.
    *C21D 1/64* (2006.01)
    *F16C 33/62* (2006.01)
    *C21D 6/00* (2006.01)
    *F16C 19/36* (2006.01)
    *C21D 1/18* (2006.01)
    *C21D 1/667* (2006.01)

(52) U.S. Cl.
    CPC ............... *C21D 6/004* (2013.01); *C21D 9/40* (2013.01); *F16C 19/364* (2013.01); *F16C 33/62* (2013.01)

(58) Field of Classification Search
    CPC ...... F16C 33/62; F16C 33/64; F16C 2202/04; F16C 2223/10
    See application file for complete search history.

(56) References Cited

U.S. PATENT DOCUMENTS

| | | |
|---|---|---|
| 2012/0020605 A1 | 1/2012 | Mori |
| 2014/0050932 A1 | 2/2014 | Gierl et al. |
| 2016/0153495 A1 | 6/2016 | Ueno |

FOREIGN PATENT DOCUMENTS

| | | |
|---|---|---|
| CN | 104232875 A | 12/2014 |
| CN | 105283684 A | 1/2016 |
| EP | 0758023 A1 | 2/1997 |
| JP | 2001-105011 A | 4/2001 |
| JP | 2001-509547 A | 7/2001 |
| JP | 2006-071022 A | 3/2006 |
| JP | 2007-182926 A | 7/2007 |
| JP | 2009-235441 A | 10/2009 |
| JP | 2013-238274 A | 11/2013 |
| JP | 2014-105824 A | 6/2014 |

OTHER PUBLICATIONS

Jul. 11, 2017 Written Opinion issued in International Patent Application No. PCT/JP2017/014073.

Nov. 4, 2019 Office Action issued in Chinese Patent Application No. 201780020906.1.

\* cited by examiner (a)   (b)

QUENCHING → TEMPERING

B − A ≧ 40°C
T ≦ 20sec (a)

(b)

BEARING RING FOR ROLLER BEARING, METHOD FOR MANUFACTURING THE SAME, AND ROLLER BEARING

TECHNICAL FIELD

An aspect of the present invention relates to a bearing ring for a roller bearing, a method for manufacturing the same, and a roller bearing including the bearing ring for a roller bearing.

BACKGROUND ART

A bearing ring for a roller bearing which constitutes the roller bearing used in vehicles, industrial machines, or the like includes a raceway portion that is in relative rolling contact with a rolling element (a roller). The raceway portion is a portion that receives a load from the rolling element due to the rolling contact with the rolling element, and mechanical characteristics thereof have a great influence on a rolling fatigue life of the roller bearing.

Therefore, a method for improving the mechanical characteristics of the raceway portion and improving the rolling fatigue life of the roller bearing is examined.

For example, as a method for making hardness of the raceway portion (a raceway surface) higher and improving the rolling fatigue life of the roller bearing, using bearing steel on which a carbonitriding process is performed as a steel material of the roller bearing bearing ring is known.

For example, Patent Document 1 proposes a bearing ring of a bearing, in which, by performing high frequency quenching on the surface alone after tempering high carbon chromium bearing steel such as SUJ2 (JIS (Japanese Industrial Standards) G4805), hardness of the surface is set to 700 HV or more, and internal hardness is set to low hardness of 340 to 490 HV, and a method for improving a rolling life of the bearing by using this bearing ring of the bearing.

RELATED ART DOCUMENT(S)

Patent Document(S)

Patent Document 1: JP-A-2013-238274

SUMMARY OF THE INVENTION

Problem to be Solved by the Invention

According to the above-described method, the rolling fatigue life of the roller bearing can be improved. However, it is desired to further improve the rolling fatigue life.

The carbonitriding process requires heat treatment in a long-period of time, and an increase in cost due to this heat treatment cannot be avoided. For this reason, a method for improving the rolling fatigue life of the roller bearing at a low cost is desired.

Meanwhile, in the raceway portion of the bearing ring for a roller bearing, a part of the raceway portion receives a high load from a rolling contact surface of the roller, which causes an area (a so-called edge load) subject to high contact pressure with the roller, and thus the rolling fatigue life of the roller bearing depends on a life of the area of the raceway portion that receives the high load.

The inventors have performed earnest examination to provide a roller bearing having an excellent rolling fatigue life in view of these circumstances. As a result, the inventors have found that providing an area having high compressive residual stress at the raceway portion of the bearing ring for a roller bearing can improve the rolling fatigue life of the roller bearing using the bearing ring for a roller bearing, and have completed the present invention.

Means for Solving the Problem

A bearing ring for a roller bearing according to an aspect of the present invention is a bearing ring for a roller bearing which has an annular shape and is formed of high carbon chromium bearing steel, and the bearing ring includes:

an inner layer part that is formed of tempering martensite or sorbite and has Vickers hardness of 450 HV or more and less than 550 HV; and an surface layer part that surrounds an entire periphery of the inner layer part, has Vickers hardness of 700 HV or more and less than 800 HV at a surface of the surface layer part, and is formed of tempering martensite, wherein the surface layer part includes a raceway portion having a raceway surface that is in rolling contact with a roller and a nonraceway portion other than the raceway portion, the raceway portion includes a first raceway portion at which compressive residual stress of the raceway surface is relatively high, and a second raceway portion at which the compressive residual stress is lower than that of the first raceway portion, and the raceway surface of the first raceway portion has a portion that is in contact with at least one of ends of the rolling contact surface of the roller in an axial direction.

The bearing ring for a roller bearing according to the aspect of the present invention includes the inner layer part that has a specified composition and hardness, and the surface layer part that surrounds the entire periphery of the inner layer part, is harder in hardness of the surface thereof than the inner layer part, and has a specified composition. For this reason, by using the bearing ring for a roller bearing, and crushing strength and impact resistance of the roller bearing can be improved.

Furthermore, the bearing ring for a roller bearing has the first raceway portion, at which the compressive residual stress of the raceway surface is high compared to another portion of the raceway portion, at a part of the raceway portion constituting the surface layer part. Here, the first raceway portion is provided at a position that has the portion that is in contact with the at least one of ends of the rolling contact surface of the roller in the axial direction. For this reason, in the roller bearing using the bearing ring for a roller bearing, the compressive residual stress of an area of the raceway surface of the bearing ring for a roller bearing (hereinafter referred to as an edge load area) is made high, where the area is subject to high contact pressure with the rolling contact surface of the roller due to receipt of a high load from the roller. As a result, in the roller bearing using the bearing ring for a roller bearing, making the rolling fatigue life longer can be achieved.

In the bearing ring for a roller bearing, the compressive residual stress of the raceway surface of the first raceway portion is preferably 250 MPa or more. In this case, the roller bearing using the bearing ring for a roller bearing can achieve the rolling fatigue life that bears comparison with the roller bearing using the bearing ring for a roller bearing on which a carbonitriding process is performed.

The compressive residual stress of the raceway surface of the first raceway portion is more preferably 320 MPa or more. In this case, in the roller bearing using the bearing ring for a roller bearing, an especially excellent rolling fatigue life can be achieved.

A method for manufacturing a bearing ring for a roller bearing according to an aspect of the present invention is a method for manufacturing the above-described bearing ring for a roller bearing, the method includes:

(A) a process of performing quenching treatment on an annular workpiece formed of high carbon chromium bearing steel;

(B) a process of performing tempering treatment on the workpiece on which the quenching treatment has been performed, and immersing the entire workpiece in a cooling liquid, and heating the workpiece in this state; and (C) a process of performing a finishing process on the workpiece on which the tempering treatment has been performed, where the process (B) is performed in a state in which a flow of the cooling liquid is generated in the cooling liquid in which the workpiece on which the quenching treatment has been performed is immersed such that the cooling liquid is concentrated on a portion at which the first raceway portion of the workpiece is formed.

In the method for manufacturing a bearing ring for a roller bearing according to an aspect of the present invention, since the tempering treatment is performed with the workpiece immersed in the cooling liquid, the workpiece in the event of tempering has a higher internal temperature than a surface temperature. For this reason, it is possible to manufacture the bearing ring for a roller bearing according to the aspect of the present invention which includes the inner layer part and the surface layer part covering the periphery of the inner layer part and in which each of the inner and surface layer parts has a predetermined structure and hardness. In the tempering treatment, low-temperature tempering associated with small volume contraction is performed close to the surface layer of the workpiece, and high-temperature tempering associated with great volume contraction is performed inside the workpiece. For this reason, due to a difference in the volume contraction, the compressive residual stress can be given to the surface layer part of the obtained bearing ring for a roller bearing.

Furthermore, the tempering treatment performed in the state in which the flow of the cooling liquid is generated in the cooling liquid in which the workpiece is immersed such that the cooling liquid is concentrated on the portion at which the first raceway portion of the workpiece is formed. For this reason, in the tempering treatment, the portion at which the first raceway portion is formed is cooled with a higher cooling capability than another portion. As a result, the raceway surface of the formed first raceway portion is configured to have higher compressive residual stress than the other portion.

According to this manufacturing method, the bearing ring for a roller bearing according to the aspect of the present invention can be manufactured.

In the method for manufacturing a bearing ring for a roller bearing, in the process (B), a jet nozzle configured to jet the cooling liquid are preferably used, jet ports of the jet nozzles preferably face the portion at which the first raceway portion is formed, and the cooling liquid is preferably jetted from the jet ports toward the portion at which the first raceway portion is formed.

In this case, due to the cooling liquid jetted from the jet nozzle, the flow of the cooling liquid concentrated on the portion at which the first raceway portion is formed can be efficiently generated in the cooling liquid in which the workpiece is immersed, and it is especially suitable to cool the portion at which the first raceway portion is formed with a higher cooling capability than the other portion.

A roller bearing according to an aspect of the present invention includes: an inner ring including a raceway portion on an outer circumferential surface thereof, an outer ring including a raceway portion on an inner circumferential surface thereof, and a plurality of rollers disposed between the raceway portions of the inner and outer rings, wherein at least one of the inner ring and the outer ring is the bearing ring for a roller bearing according to the aspect of the present invention.

The roller bearing according to the aspect of the present invention has an excellent rolling fatigue life.

Advantages of the Invention

According to the aspect of the present invention, a roller bearing having an excellent rolling fatigue life can be provided at a low cost.

MODE FOR CARRYING OUT THE INVENTION

[Roller Bearing]

First, a roller bearing according to an embodiment of the present invention will be described.

Figure 1:
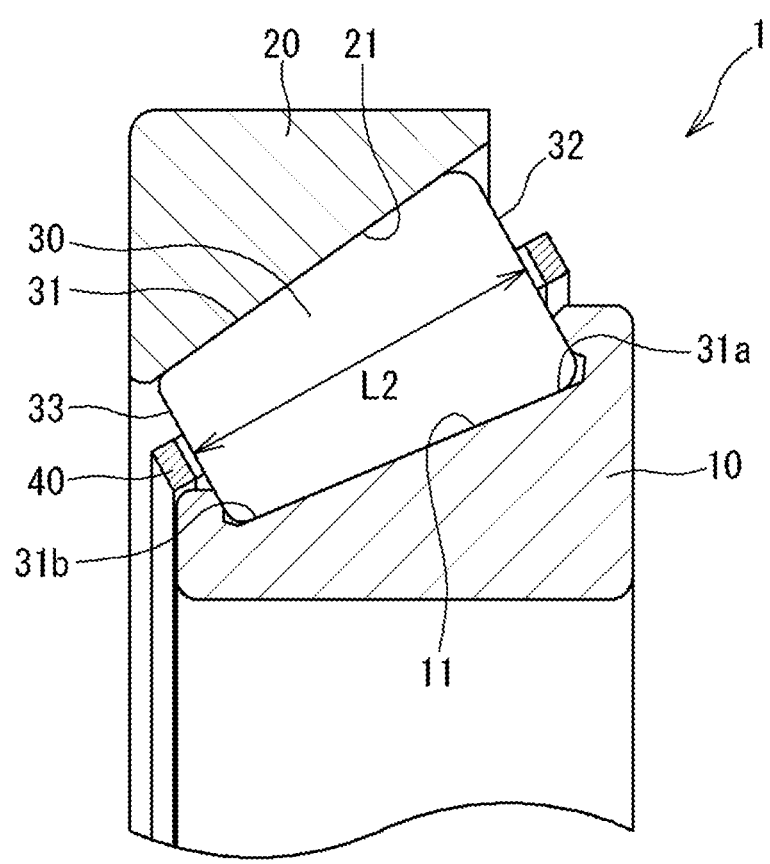
FIG. 1 is a sectional view illustrating main parts of a tapered roller bearing according to an embodiment of the present invention.

Hereinafter, a tapered roller bearing will be described as an example of the roller bearing. FIG. 1 is a sectional view illustrating main parts of a tapered roller bearing according to an embodiment of the present invention.

A tapered roller bearing 1 according to the present embodiment includes an inner ring 10 that includes an inner ring raceway surface 11 formed of a conical surface on an outer circumference thereof, an outer ring 20 that includes an outer ring raceway surface 21 formed of a conical surface on an inner circumference thereof, a plurality of tapered rollers 30, each of which has a rolling contact surface 31 formed of a conical surface on an outer circumference thereof and is disposed to be capable of rolling between both of the raceway surfaces 11 and 21, and a cage 40 that retains the plurality of tapered rollers 30 at predetermined intervals in a circumferential direction.

The inner ring 10, the outer ring 20, and the tapered rollers 30 are formed of high carbon chromium bearing steel. The high carbon chromium bearing steel includes, for instance, SUJ2, SUJ3 (JIS G4805), or the like.

In the tapered roller bearing 1, the rolling contact surfaces 31 of the tapered rollers 30 are in rolling contact with the inner ring raceway surface 11 and the outer ring raceway surface 21. In this case, each of the rolling contact surfaces 31 of the tapered rollers 30 is in contact with the inner ring raceway surface 11 and the outer ring raceway surface 21 at edge portions 31a and 31b (opposite ends of the rolling contact surface 31 in an axial direction) of the rolling contact surface 31 with roller end faces 32 and 33 at a high contact pressure, and edge loads occur around the edge portions 31a and 31b.

Especially, in the inner ring 10 of the tapered roller bearing 1, a contact pressure between the edge portion 31a of a large diameter side of the rolling contact surface 31 and the inner ring raceway surface 11 of the inner ring 10 becomes high.

In this regard, in the tapered roller bearing 1, at least one of the inner ring 10 and the outer ring 20 is formed by the bearing ring for a roller bearing according to the embodiment of the present invention which includes a first raceway portion having high compressive residual stress in the raceway portion. For this reason, the tapered roller bearing 1 has a long rolling fatigue life, and furthermore sufficient impact resistance and crushing strength are secured.

[Bearing Ring for Roller Bearing]

Figure 2:
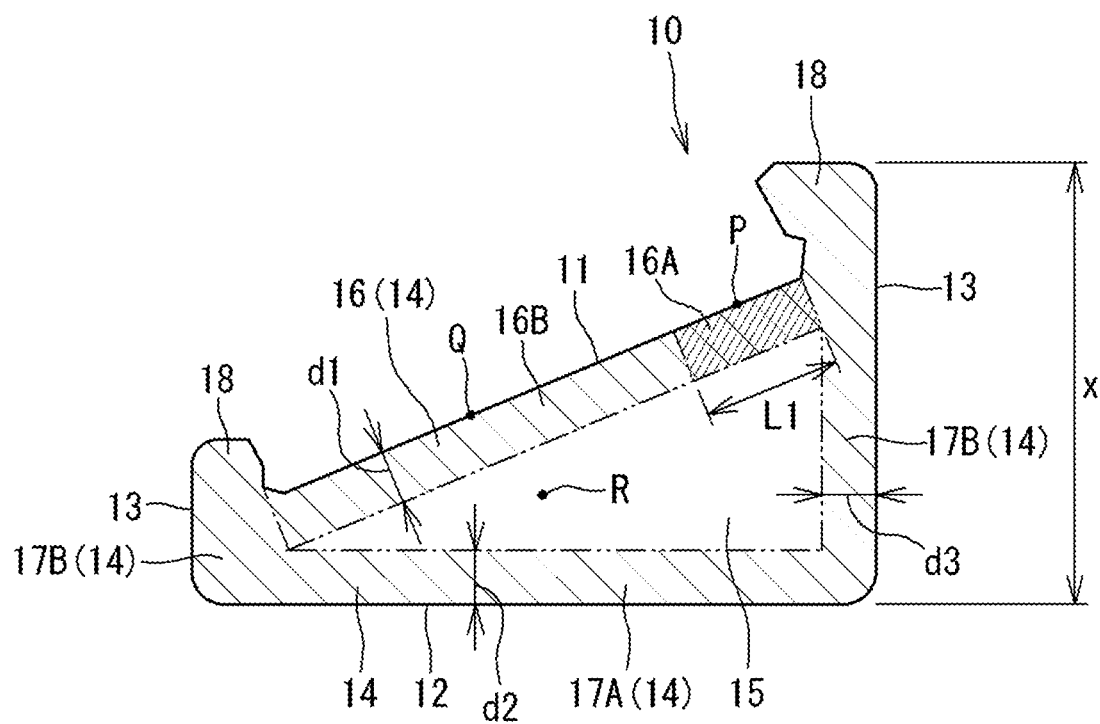
FIG. 2 is a sectional view illustrating main parts of an inner ring of the tapered roller bearing illustrated in FIG. 1.

Next, the bearing ring for a roller bearing according to the embodiment of the present invention will be described. Here, the inner ring 10 of the tapered roller bearing 1 illustrated in FIG. 1 will be described by way of example. FIG. 2 is a sectional view illustrating main parts of the inner ring of the tapered roller bearing illustrated in FIG. 1.

In this specification, "Vickers hardness" refers to a value measured by striking a Vickers indenter on a surface of the bearing ring for a roller bearing (for instance, the inner ring) or a cutting surface obtained by cutting the bearing ring for a roller bearing along a radial direction.

The inner ring 10 illustrated in FIG. 2 includes an inner layer part 15 and an surface layer part 14 that surrounds the entire periphery of the inner layer part 15, and is configured such that the surface layer part 14 has relatively higher hardness than the inner layer part 15 (based on the Vickers hardness). For this reason, the inner ring 10 is excellent in crushing strength and impact resistance.

The inner layer part 15 has a structure of martensite or sorbite by tempering. Vickers hardness of the inner layer part 15 is 450 HV or more and less than 550 HV. The inner ring 10 is provided with this inner layer part 15, so that the sufficient crushing strength and impact resistance can be secured.

When the Vickers hardness of the inner layer part 15 is less than 450 HV, the crushing strength becomes insufficient. Meanwhile, when the Vickers hardness is 550 HV or more, the impact resistance becomes insufficient.

The surface layer part 14 is formed to surround the entire periphery of the inner layer part 15 and has a structure of martensite by tempering.

Vickers hardness of the surface of the surface layer part 14 is not less than 700 HV and less than 800 HV. When the Vickers hardness of the surface of the surface layer part 14 is less than 700 HV, the rolling fatigue life becomes short. Meanwhile, when the Vickers hardness is 800 HV or more, the impact resistance is lowered.

For the Vickers hardness of the surface layer part 14, the Vickers hardness of the surface is within the above range and may be harder than the Vickers hardness of the inner layer part 15, and hardness may be gradually reduced from the surface of the surface layer part 14 toward the inner layer part 15.

The surface layer part 14 includes a raceway portion 16 whose surface is the inner ring raceway surface 11 that is in rolling contact with the tapered rollers 30, a nonraceway portion 17A whose surface is an inner circumferential surface 12 of the inner ring 10, and nonraceway portions 17B that include surfaces of the collar parts 18 of the inner ring 10 and lateral surfaces 13 as parts of surfaces thereof.

In addition to the Vickers hardness of the surface being within the above range, the surface layer part 14 (the raceway portion 16 and the nonraceway portions 17A and 17B) preferably has a region with a predetermined depth from the surface toward the inner layer part 15 (hereinafter referred to as a high hardness surface layer (see a hatched line portion in FIG. 2. The hatched line portion is schematically indicated to illustrate a depth of the high hardness surface layer, and actual dimensions of the high hardness surface layer are not necessarily reflected)) in which the Vickers hardness is 700 HV or more.

A depth d1 of the high hardness surface layer in the raceway portion 16 preferably satisfies Inequality (1) below with respect to a maximum shear stress depth Z0 when the inner ring 10 is used.

$$3Z0 \leq d1 < 8Z0 \tag{1}$$

When the depth d1 is less than three times the maximum shear stress depth Z0, fatigue strength of the surface may be reduced, and the rolling fatigue life of the inner ring 10 may be reduced. Meanwhile, when the depth d1 is more than or equal to eight times the maximum shear stress depth Z0, an occupying ratio of a region containing a softer structure than the surface may be reduced, and toughness of the inner ring 10 may be made insufficient.

In the present embodiment, the maximum shear stress depth Z0 when the bearing ring for a roller bearing is used differs according to a rated load, but is generally about 0.1 to 0.2 mm.

Both a depth d2 of the high hardness surface layer in the nonraceway portion 17A and a depth d3 of the high hardness surface layer in the nonraceway portion 17B preferably satisfy Inequality (2) below with ratios thereof to a maximum thickness x of the inner ring 10 in a radial direction (d2/x and d3/x).

$$0.02 < (d2/x, d3/x) \leq 0.04 \tag{2}$$

When the ratios of the depths d2 and d3 of the high hardness surface layers to the maximum thickness x is less than or equal to 0.02, the crushing strength may be made insufficient. Meanwhile, when the ratios exceed 0.04, the occupying ratio of the high hardness surface layer may be high, and the impact resistance may be made insufficient.

The raceway portion 16 includes a first raceway portion 16A provided to include a portion (an edge load area) where the contact pressure with the rolling contact surface 31 of the tapered roller 30 in the tapered roller bearing 1 gets higher, and a second raceway portion 16B other than the first raceway portion 16A.

Both compressive residual stress and Vickers hardness of a surface (a raceway surface) of the first raceway portion 16A are made higher than those of a surface (a raceway surface) of the second raceway portion 16B. Thereby, mechanical characteristics of the first raceway portion 16A can be improved, and the rolling fatigue life of the roller bearing using the inner ring 10 can be made longer.

The compressive residual stress of the surface of the first raceway portion 16A is preferably 250 MPa or higher. Thereby, the inner ring 10 is hardly damaged, and making the rolling fatigue life longer can be effectively achieved.

The compressive residual stress of the surface of the first raceway portion 16A is more preferably 320 MPa or higher in that making the rolling fatigue life further longer can be achieved.

Meanwhile, the upper limit of the compressive residual stress of the surface of the first raceway portion 16A is not particularly limited, but is preferably 1000 MPa. When the compressive residual stress is too high, an extreme value of a tensile residual stress may occur, and a brittle structure may be formed by plastic deformation.

In the first raceway portion 16A, the compressive residual stress of the region from the surface to the depth Z0 is preferably 250 MPa or higher, because this is more suitable to make the rolling fatigue life longer.

The compressive residual stress of the surface of the second raceway portion 16B is preferably 50 MPa or higher, because this is suitable to make the rolling fatigue life longer.

Meanwhile, if the compressive residual stress of the surface of the second raceway portion 16B is lower than the compressive residual stress of the surface of the first raceway portion, the upper limit thereof is not particularly limited. However, like the compressive residual stress of the surface of the first raceway portion, when the compressive residual stress is too high, the extreme value of the tensile residual stress may occur, and the brittle structure may be formed by plastic deformation.

In the second raceway portion 16B, the compressive residual stress of the region from the surface to the depth Z0 is preferably 50 MPa or higher. Thereby, the rolling fatigue life can be made further longer.

In the raceway portion 16 of the inner ring 10, a length L1 of the first raceway portion 16A in the axial direction is preferably 10 to 30% of a roller width L2 of the tapered roller 30 (see FIG. 1).

When the length L1 is less than 10% of the roller width L2, it is difficult to perform positioning alignment such that the first raceway portion 16A is reliably provided at the edge load area. On the other hand, when the length L1 exceeds 30% of the roller width L2, it is difficult to give high compressive residual stress that exceeds 250 MPa.

In this inner ring 10, the first raceway portion 16A whose raceway surface has high compressive residual stress is provided at a position in the raceway portion 16 that includes the edge load area where the contact pressure with the tapered roller 30 is high. For this reason, the roller bearing using the inner ring 10 has excellent rolling fatigue life.

(Others)

In the inner ring 10, the first raceway portion 16A having the high compressive residual stress is provided at a large diameter side (the right side of FIG. 2) of the raceway portion 16.

Meanwhile, in the tapered roller bearing, as described above, the edge load area may occur around the opposite ends of the tapered roller in the axial direction. For this reason, in the bearing ring for a roller bearing according to the embodiment of the present invention, the first raceway portion 16A having the high compressive residual stress may be provided in two places at the large and small diameter sides of the raceway portion 16.

In the tapered roller bearing, the edge load area occurring at the large diameter side of the tapered roller generally has a higher contact pressure than that occurring at the small diameter side. For this reason, even when the first raceway portion 16A is provided in one place at the large diameter side like the inner ring 10, the rolling fatigue life can be sufficiently made longer.

The bearing ring for a roller bearing according to the embodiment of the present invention is not limited to the inner ring of the tapered roller bearing, and may be an outer ring. The bearing ring may be an inner ring or an outer ring of another roller bearing such as a cylindrical roller bearing or a needle roller bearing.

[Method for Manufacturing the Bearing Ring for a Roller Bearing]

Next, with regard to a method for manufacturing the bearing ring for a roller bearing according to the embodiment of the present invention, a method for manufacturing the inner ring 10 will be describe by way of example.

FIGS. 3(a) to 3(e) are process charts of a method for manufacturing the inner ring illustrated in FIG. 2. FIGS. 4(a) and 4(b) are process charts for illustrating a quenching treatment and a tempering treatment in the manufacturing method illustrated in FIGS. 3(a) to 3(e).

Figure 3:
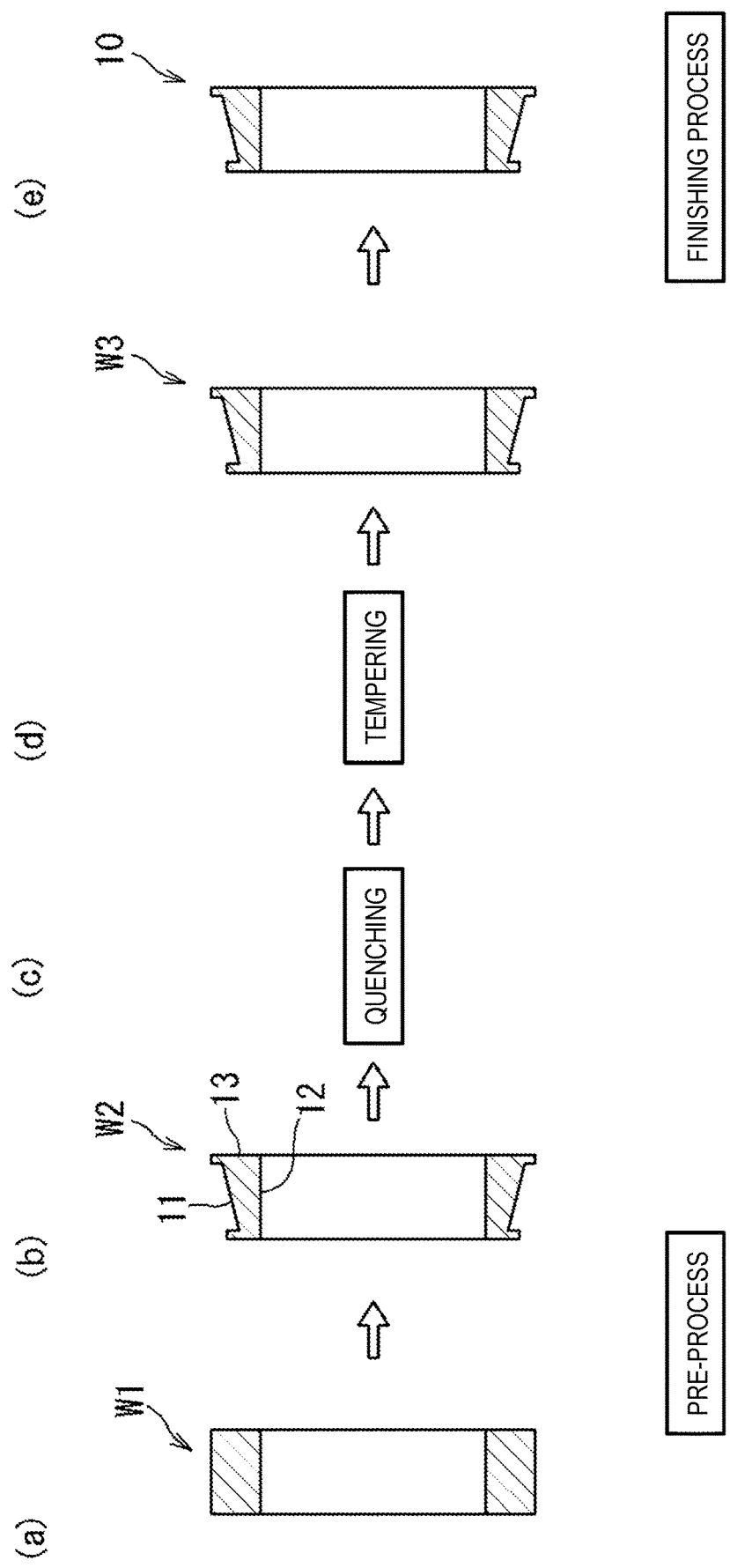
FIGS. 3(a) to 3(e) are process charts of a method for manufacturing the inner ring illustrated in FIG. 2.
Figure 4:
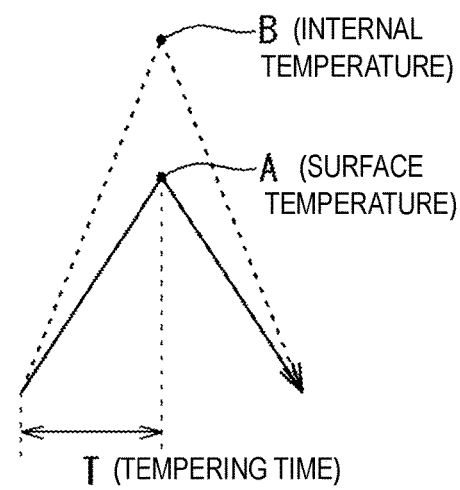
FIGS. 4(a) and 4(b) are process charts for illustrating a quenching treatment and a tempering treatment illustrated in FIGS. 3(c) and 3(d).

First, an annular blank W1 (see FIG. 3(a)) formed of the high carbon chromium bearing steel is manufactured. Next, by subjecting the obtained annular blank W1 to a cutting process or the like and processing the obtained annular blank W1 into a predetermined shape, a pre-process obtaining a pre-form (a workpiece) W2 of the inner ring 10 including portions corresponding to the inner ring raceway surface 11, the inner circumferential surface 12, and the lateral surfaces 13 is performed (see FIG. 3(b)).

Next, the quenching treatment (see FIGS. 3(c) and 4(a)) is performed on the obtained workpiece W2.

The quenching treatment preferably cools the workpiece rapidly after the entire workpiece is uniformly heated such that the entire workpiece after the quenching treatment is composed of martensite and has an imperfect quenching structure (fine pearlite) less than or equal to 5%. When the imperfect quenching structure exceeds 5%, hardness of the manufactured inner ring 10 may become insufficient, and the rolling fatigue life may be shorter.

The method for the quenching treatment is not particularly limited, and can employ a method such as induction quenching, immersion perfect quenching.

For example, the quenching treatment can be performed under conditions that the workpiece W2 is heated at a quenching temperature of 810 to 850° C. for 0.5 to 2 hours and is rapidly cooled.

The quenching temperature is preferably higher than or equal to 820° C. in terms of securing sufficient hardenability, and preferably lower than or equal to 840° C. in terms of preventing coarsening of grains.

The heating time is preferably more than or equal to 0.5 hours in terms of uniformly heating a member, and preferably less than or equal to 1.5 hours in terms of preventing coarsening of grains.

The quenching is performed by, for instance, oil cooling in an oil bath of cooling oil. A temperature of the oil bath of the cooling oil is typically 60 to 180° C.

Next, an intermediate blank W3 is obtained by performing tempering treatment on the pre-form (the workpiece) W2 after the quenching treatment (see FIGS. 3(d) and 4(b)).

In the tempering treatment, the workpiece W2 is heated for a predetermined period of time by induction heating in a state in which it is immersed in a cooling liquid, and then is cooled, for instance, in the cooling liquid. The cooling of the workpiece W2 can be performed by, for instance, air cooling, radiation cooling, or the like.

Thereby, in the tempering treatment, as illustrated in FIG. 4(b), a tempering temperature (see "surface temperature A" of FIG. 4(b)) of a surface of the workpiece W2 after the quenching treatment can be set to a temperature lower than a tempering temperature (see "internal temperature B" of FIG. 4(b)) inside the workpiece W2.

In the tempering treatment, as the surface temperature A is set to a temperature lower than the internal temperature B, the inner layer part having hardness suitable to obtain the impact resistance can be formed. In addition, as the tempering treatment is performed under the above conditions, a reduction in a remaining austenite amount during the tempering treatment can be suppressed, and the compressive stress can be increased.

In this case, a difference between the surface temperature A and the internal temperature B (the internal temperature B−surface temperature A) is preferably set to be higher than or equal to 40° C., because it is more suitable to obtain the inner ring 10 including the predetermined inner layer part 15 and the predetermined surface layer part 14.

The difference between the surface temperature A and the internal temperature B (the internal temperature B−surface temperature A) is preferably lower than or equal to 600° C. When the difference exceeds 600° C., cracks may occur in the workpiece W2.

In the tempering treatment, a tempering time (see "tempering time T" of FIG. 4(b)) is preferably less than or equal to 20 seconds. Thereby, sufficient compressive residual stress can be given to the workpiece W2. The tempering time is more preferably less than or equal to 18 seconds.

In terms of suppressing occurrence of temperature unevenness and stabilizing a quality of the inner ring, the tempering time T is preferably more than or equal to two seconds, and more preferably more than or equal to three seconds.

In the present embodiment, the "tempering time" is an energization time during the induction heating.

The tempering treatment is preferably performed with a specific temperature adjusted such that the internal temperature is set to 320 to 715° C. when the surface temperature is 170 to 290° C.

In terms of securing the rolling fatigue life of the roller bearing, the surface temperature is preferably lower than or equal to 275° C.

In terms of securing the impact resistance, the internal temperature is preferably higher than or equal to 365° C., and more preferably higher than or equal to 450° C. In terms of securing the crushing strength, the internal temperature is more preferably lower than or equal to 575° C. When the internal temperature is 450 to 575° C., a long rolling fatigue life and high impact resistance can be secured, and this internal temperature is more suitable to secure high crushing strength.

In the present embodiment, the surface temperature is a temperature of the portion where the second raceway portion 16B of the surface of the workpiece W2 is formed. The surface temperature and the internal temperature can be measured by a K type thermocouple.

The tempering temperature can be adjusted by a frequency or output during the induction heating, the tempering time, or the like.

In the present embodiment, the tempering treatment may be performed, for instance, using a heat treatment apparatus below.

Figure 5:
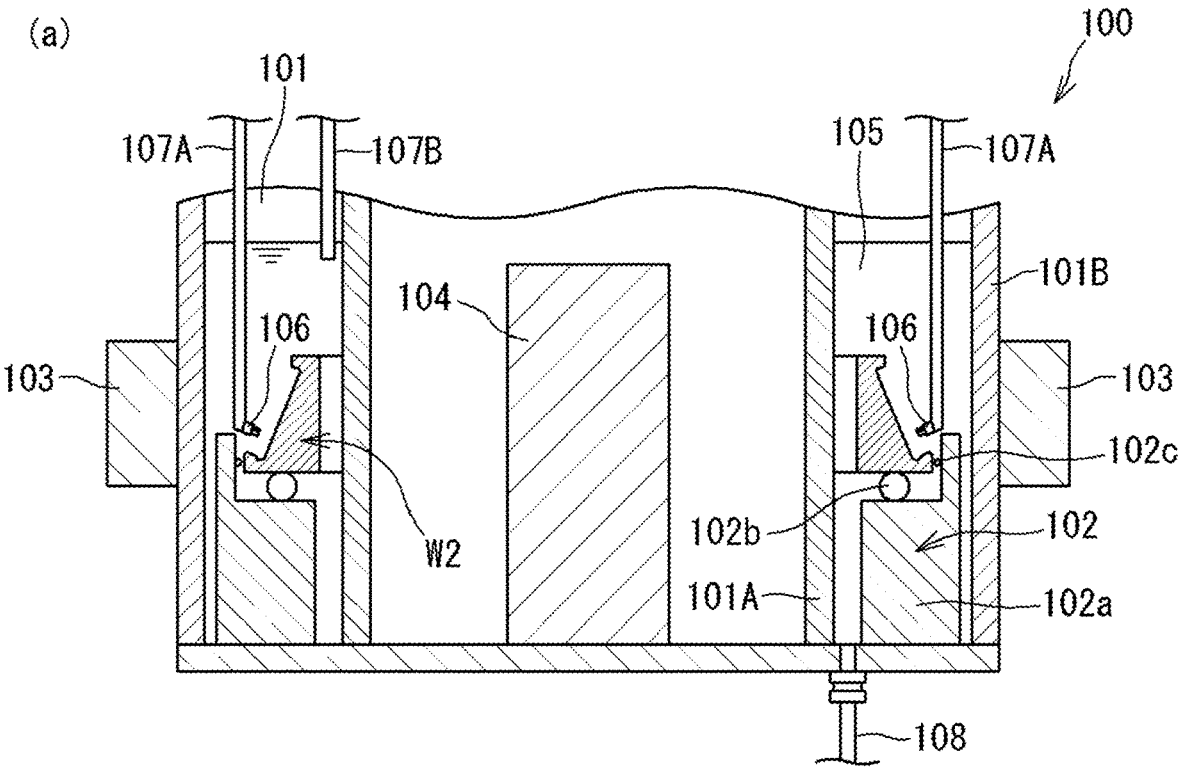
FIG. 5(a) is a schematic description view illustrating an example of a heat treatment apparatus used in a method for manufacturing a bearing ring for a roller bearing according to the embodiment of the present invention.
FIG. 5(b) is an enlarged view of main parts of FIG. 5(a).
Figure 5:
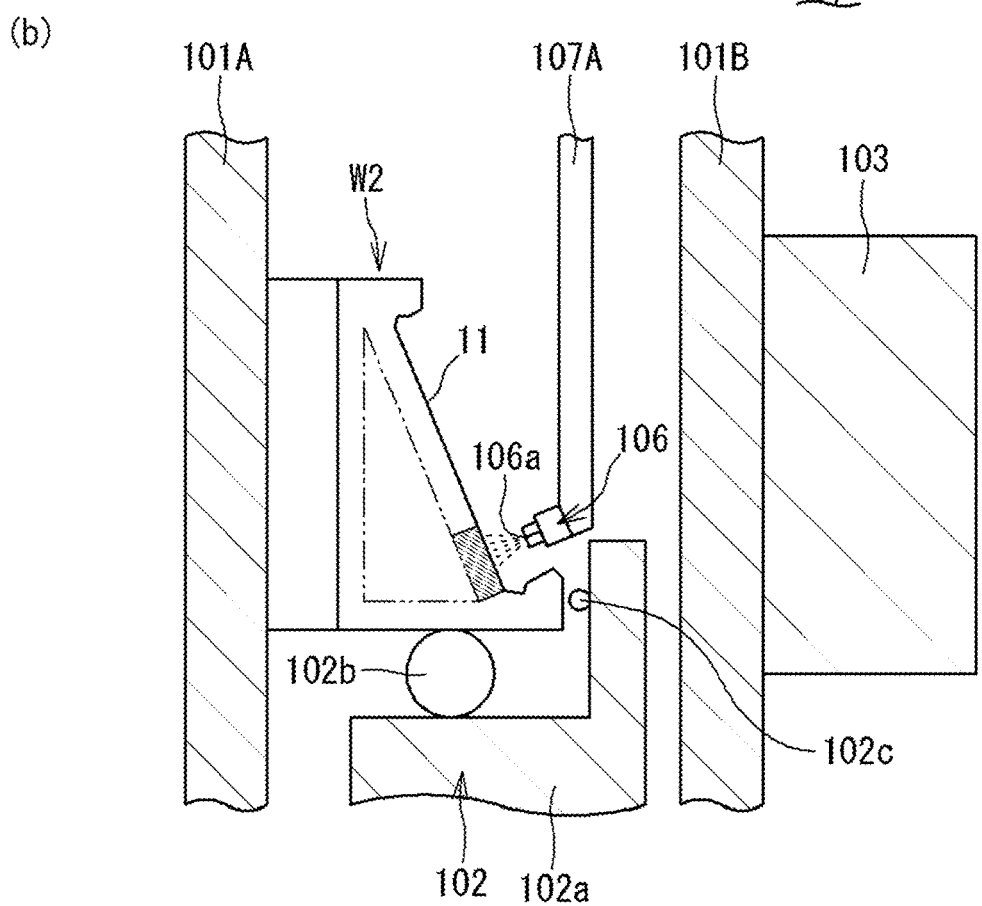

FIG. 5(a) is a schematic description view illustrating an example of the heat treatment apparatus used in the present embodiment, and FIG. 5(b) is an enlarged view of main parts of FIG. 5(a).

The heat treatment apparatus 100 illustrated in FIGS. 5(a) and 5(b) includes a treatment tank 101 in which an annular workpiece W2 (a pre-form to be subjected to heat treatment) is set, and that performs heat treatment on the workpiece W2, a holding jig 102 that holds the workpiece W2, an induction heating coil 103 that is disposed to surround the workpiece W2 on an outer circumferential side of the workpiece W2 and performs induction heating on the workpiece W2, a center core 104 that is installed on an inner circumferential side of the workpiece W2, a cooling liquid 105 that is stored in the treatment tank 101 and acts as a cooling medium cooling the workpiece W2, jet nozzles 106 that spray the cooling liquid 105 on the workpiece W2, and supply pipes 107A and 107B for supplying the cooling liquid 105 to the jet nozzles 106 and the treatment tank 101.

The treatment tank 101 is a bottomed annular container that can store the cooling liquid 105, and includes a cylindrical inner case 101A and a cylindrical outer case 101B. The container constituting the treatment tank 101 is formed of electrically insulating ceramic or electrically insulating synthetic resin. In this way, the heat treatment apparatus 100 includes the container formed of electrically insulating ceramic or electrically insulating synthetic resin as the treatment tank 101, and thus heating of the heat treatment apparatus 100 itself can be suppressed.

A size of the container can be adequately set by the usage of the heat treatment apparatus 100, a size of the workpiece W2, or the like.

The cooling liquid 105 is stored in the treatment tank 101. The treatment tank 101 is provided with a drain 108 for draining the surplus cooling liquid 105 to the outside of the treatment tank 101.

The workpiece W2 is set in the treatment tank 101 to be immersed in the cooling liquid 105.

The holding jig 102 includes a jig main body 102a, a support portion (a first support portion) 102b that receives and stops a lower surface of the workpiece W2 in point contact, and a support portion (a second support portion) 102c that restrains movement of the workpiece W2 in a horizontal direction. The holding jig 102 restrains the movement of the workpiece W2 in the horizontal direction while holding the workpiece W2 in point contact. In this case, the support portion 102c may be in contact with the workpiece W2, or a gap of maximum 0.5 mm or so may be formed between the support portion 102c and the workpiece W2. When the gap is provided, the surface of the workpiece W2 can avoid being pressed by the support portion 102c even when the workpiece W2 is thermally expanded during heating.

Each of the support portions 102b and 102c is a spherical body. For this reason, when the workpiece W2 is in contact with the support portions 102b and 102c, both are in point contact with each other. Thus, heat conduction from the workpiece W2 to the support portions 102b and 102c is suppressed, and a temperature of the workpiece W2 can be prevented from becoming non-uniform. Simultaneously, cooling of the workpiece W2 caused by the cooling liquid 105 is hardly inhibited by the support portions 102b and 102c, and thus overheating of the workpiece W2 caused by insufficient cooling can be prevented. Each of the number of support portions 102b and the number of support portions 102c may be three or more in a circumferential direction in plan view, is typically three to six, and is preferably three at a regular interval.

The holding jig 102 is formed of electrically insulating ceramic or an electrically insulating synthetic resin. Thereby, heating of the holding jig 102 itself or a variation in surface temperature of the workpiece W2 can be suppressed.

The induction heating coil 103 is installed outside the outer case 101B. The induction heating coil 103 is of a spiral coil having a larger inner diameter than an outer diameter of the outer case 101B.

The center core 104 is installed inside the inner case 101A. The center core 104 is a rod-like body having a smaller outer diameter than an inner diameter of the inner case 101A, and formed of silicon steel.

In the heat treatment apparatus 100, by supplying a high-frequency current to the induction heating coil 103, the entire workpiece W2 can be induction-heated to a desired temperature.

The induction heating coil 103 and the center core 104 may be installed in the treatment tank 101.

The cooling liquid 105 may be a liquid that can cool the surface of the workpiece W2. The cooling liquid 105 includes, for instance, water, oil, water-soluble polymer, or the like.

The oil includes, for instance, quenching oil or the like.

The water-soluble polymer includes, for instance, polyalkylene glycol (PAG). The water-soluble polymer may be used as an aqueous solution in which it has been solved in water. In this case, a blending quantity of the water-soluble polymer into the water can be appropriately set depending on a type of the water-soluble polymer or the like.

In terms of efficiently cooling the surface of the workpiece W2, the cooling liquid 105 preferably has a high heat transfer coefficient, and is more preferably one that can be handled easily.

The jet nozzles 106 are mounted on a tip portion of the supply pipe 107A for supplying the cooling liquid 105 to the treatment tank 101. The plurality of jet nozzles 106 are provided at predetermined intervals in a circumferential direction of the workpiece W2. Each of the jet nozzles 106 has a jet port 106a that is disposed to face the inner ring raceway surface 11 of the workpiece W2. The jet port 106a is disposed to closely face a portion (a hatched line portion of FIG. 5(b)) where the first raceway portion of the workpiece W2 is formed.

The supply pipe 107A is provided with a flow regulating valve and a pressure regulating valve (neither of which is shown). Thereby, supply conditions of the cooling liquid can be regulated.

In the heat treatment apparatus 100, the cooling liquid 105 supplied via the supply pipes 107A and 107B are stored in the treatment tank 101, and the surplus cooling liquid 105 is drained from the drain 108.

The heat treatment apparatus 100 may include a circulation passage (not shown) for supplying the drained cooling liquid 105 into the treatment tank 101 again.

In addition, although not illustrated, the heat treatment apparatus 100 includes necessary members such as a power supply required for the induction heating, a matching circuit, a temperature conditioning member for controlling a temperature of a coolant.

The heat treatment apparatus 100 may include a mechanism for rotating the workpiece W2 around the axis during the heating or the like.

In the tempering treatment using this heat treatment apparatus 100, as described above, the workpiece W2 is installed in the treatment tank 101 and is heated in a state in which it is immersed in the cooling liquid 105.

In this case, the induction heating is performed in a state in which a flow of the cooling liquid 105 by which the cooling liquid 105 is concentrated on the portion where the first raceway portion 16A of the workpiece W2 is formed is generated in the cooling liquid 105 stored in the treatment tank 101.

To be specific, the induction heating may be performed while supplying the cooling liquid 105 by means of jetting from the jet ports 106a of the plurality of jet nozzles 106 toward the portion where the first raceway portion 16A is formed. Thereby, the portion where the first raceway portion 16A of the workpiece W2 is formed can be cooled with a higher cooling capability than the other portion. For this reason, higher compressive residual stress can be given to the first raceway portion 16A of the inner ring 10 completed through a post process than the other portion (the second raceway portion 16B).

If this method is adopted, the compressive residual stress lower than that given to the first raceway portion 16A can also be given to the other raceway portion 16 (the second raceway portion 16B) of the inner ring 10.

A frequency and output in the event of the induction heating can be appropriately set depending on the shape or size of the workpiece W2, the cooling capability of the cooling liquid, or the like.

A supply amount of the cooling liquid 105 when the cooling liquid 105 is supplied from the jet nozzles 106 by jetting depends on the number of jet nozzles 106, the shape or size of the workpiece W2, the cooling capability of the cooling liquid, or the like, but it may be set to, for instance, 8 to 80 L/min.

The temperature of the cooling liquid 105 supplied from the jet nozzles 106 depends on the shape or size of the workpiece W2, the cooling capability of the cooling liquid, or the like, but it may be set to, for instance, 5 to 80° C.

Finally, with regard to an intermediate blank W3 after the tempering process, a finishing process such as a polishing process is performed on a portion or the like that corresponds to the inner ring raceway surface 11 (see FIG. 3(e)).

By undergoing this process, the inner ring 10 (the bearing ring for a roller bearing) can be manufactured.

(Others)

In a method for manufacturing the bearing bearing ring according to the embodiment of the present invention, when the cooling liquid is supplied via the jet nozzles by jetting, if the flow of the cooling liquid by which the cooling liquid is concentrated on the portion where the first raceway portion 16A of the workpiece W2 is formed can be generated in the cooling liquid, the jet nozzles may not be necessarily disposed such that the jet ports face the portion where the first raceway portion 16A of the workpiece W2 is formed.

Figure 6:
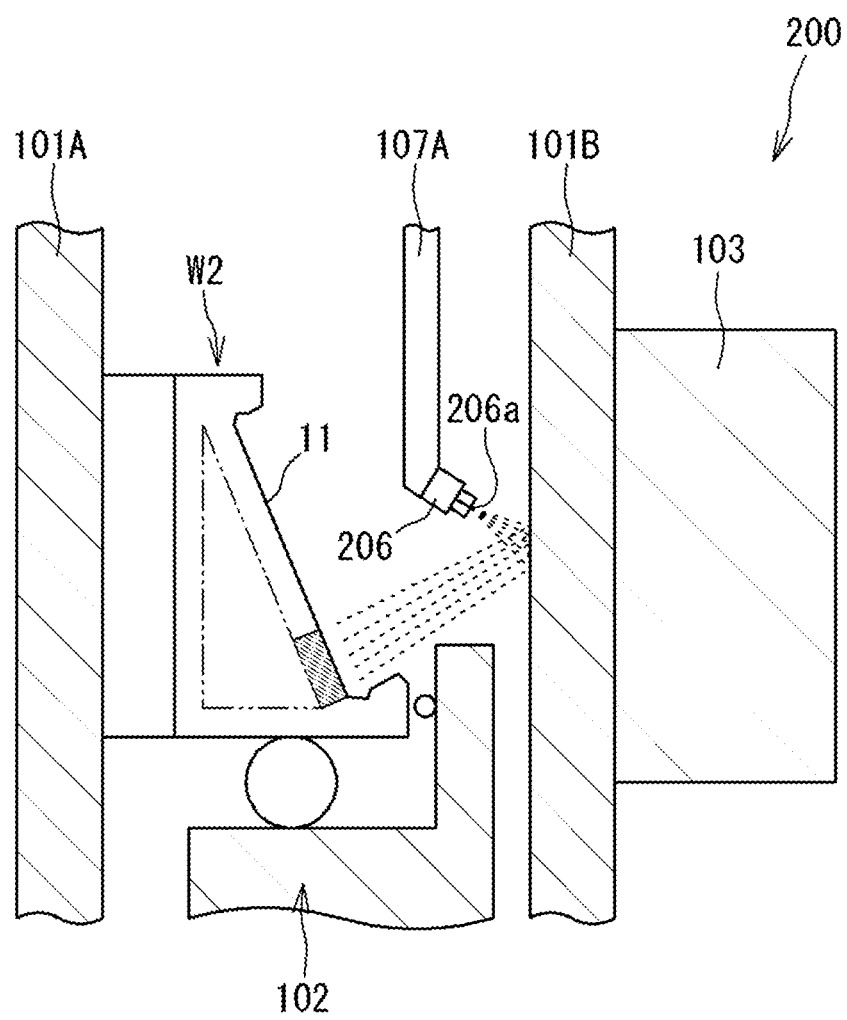
FIG. 6 is an enlarged view of main parts illustrating another example of the heat treatment apparatus used in the method for manufacturing the bearing ring for a roller bearing according to the embodiment of the present invention.

FIG. 6 is an enlarged view of main parts illustrating another example of the heat treatment apparatus used in the method for manufacturing the bearing ring for a roller bearing according to the embodiment of the present invention.

In the method for manufacturing the bearing ring for a roller bearing according to the embodiment of the present invention, the tempering treatment may be performed using the heat treatment apparatus 200 illustrated in FIG. 6. The heat treatment apparatus 200 has the same configuration as the heat treatment apparatus 100 illustrated in FIGS. 5(a) and 5(b) except that mounting directions of the jet nozzles 206 are different from mounting directions of the jet nozzles 106. In the heat treatment apparatus 200, the same reference signs as the heat treatment apparatus 100 are given to the same members as the heat treatment apparatus 100.

Like the tempering treatment using the heat treatment apparatus 100, the tempering treatment using the heat treatment apparatus 200 is performed by installing the workpiece W2 in the treatment tank 101 such that the workpiece W2 is kept immersed in the cooling liquid 105, and performing induction heating in a state in which a flow of the cooling liquid 105 by which the cooling liquid 105 is concentrated on the portion where the first raceway portion 16A of the workpiece W2 is formed is generated.

In this case, a plurality of jet nozzles 206 are installed such that the cooling liquid 105 supplied from jet ports 206a of the jet nozzles 206 by jetting is reflected on an inner wall surface of the outer case 101B located at an outer circumferential side of the workpiece W2 and directed to the portion where the first raceway portion 16A of the workpiece W2 is formed.

Thereby, even when the tempering treatment is performed using the heat treatment apparatus 200, by performing the induction heating while supplying the cooling liquid 105 from the jet nozzles 206, the portion where the first raceway portion 16A of the workpiece W2 is formed can be cooled with a higher cooling capability than another portion.

For this reason, even when the heat treatment apparatus 200 is used, compressive residual stress higher than that is given to the other portion (the second raceway portion 16B) can be given to the first raceway portion 16A of the inner ring 10 completed through a post process. Furthermore, the compressive residual stress lower than that given to the first raceway portion 16A can also be given to the other raceway portion 16 (the second raceway portion 16B) of the inner ring 10.

In the case in which the heat treatment apparatus 200 is used, like the case in which the heat treatment apparatus 100 is used, a frequency and output in the event of the induction heating can be appropriately set depending on the shape or size of the workpiece W2, the cooling capability of the cooling liquid, or the like.

A supply amount or temperature of the cooling liquid 105 when the cooling liquid 105 is supplied from the jet nozzles 206 by jetting can adopt conditions to the same extent as the case in which the heat treatment apparatus 100 is used.

In the heat treatment apparatuses 100 and 200, the center core is provided inside the workpiece W2. However, in place of the center core, an induction heating coil may also be provided inside the workpiece W2. In this case, the entire workpiece can be heated.

EXAMPLES

Hereinafter, operation and effects of the embodiment of the present invention will be verified by examples or the like. The embodiment of the present invention is not limited to the following examples.

Example 1

An annular blank was manufactured from a steel material formed of SUJ2, and the obtained annular blank was subjected to a cutting process to have a predetermined shape. Thereby, a workpiece (having an outer diameter of 53 mm and a maximum wall thickness x (see FIG. 2) of 12.0 mm) for an inner ring was obtained. Next, the obtained workpiece was subjected to quenching treatment and tempering treatment under heat treatment conditions shown in Table 1 and FIG. 7, and was subjected to a polishing process, and a test piece of the inner ring for a bearing (having a model number of TRA0607) was obtained.

Here, the quenching treatment was performed using an atmosphere heat treatment furnace, and the tempering treatment was performed using the heat treatment apparatus 100 illustrated in FIGS. 5(a) and 5(b).

Figure 7:
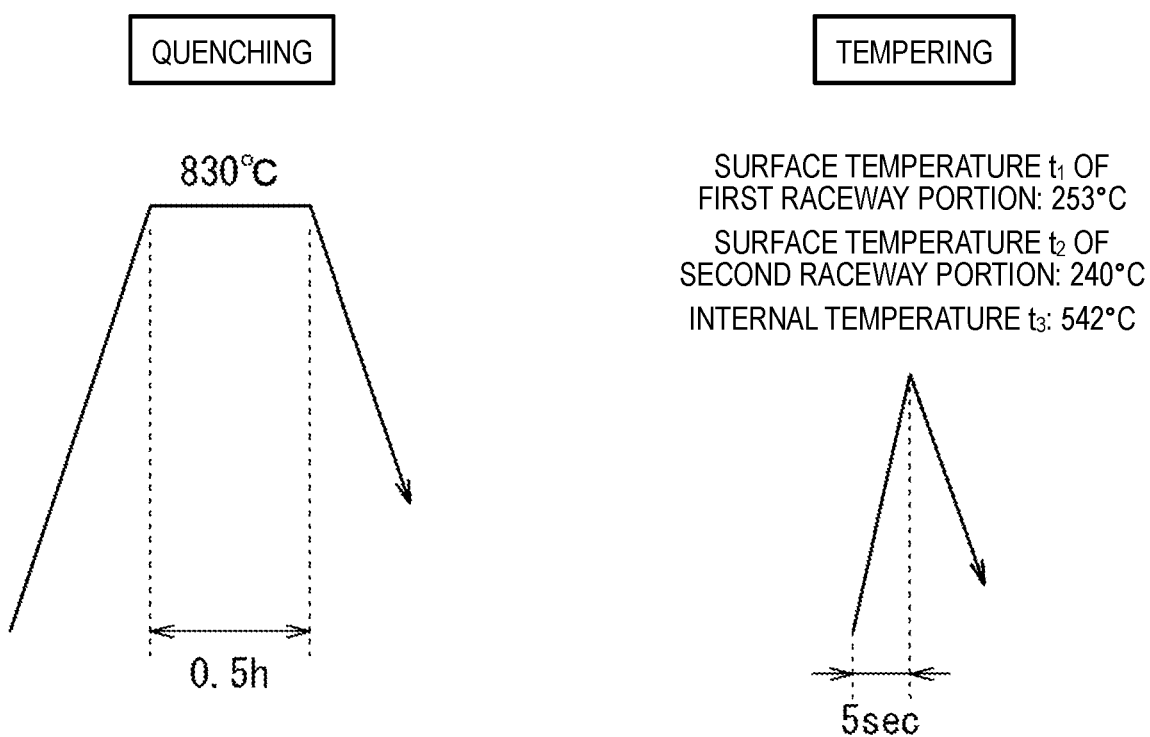
FIG. 7 is a line diagram illustrating heat treatment conditions in Example 1.

FIG. 7 is a line diagram illustrating heat treatment conditions in Example 1.

In Example 1, as illustrated in FIG. 7, the workpiece was subjected to quenching as a whole by being heated at 830° C. for 0.5 hour, and then was oil-cooled to 80° C.

Afterward, the workpiece was set inside the heat treatment apparatus 100 illustrated in FIGS. 5(a) and 5(b), and, while cooling a surface of the workpiece, was subjected to induction heating at a frequency of 1560 Hz with output of 185 kW for 5 seconds and to tempering with a surface temperature (hereinafter referred to simply as a surface temperature of a first raceway portion in the description of Examples and Comparative Examples) t1 of a portion where the first raceway portion was formed set to 253° C., with a surface temperature (hereinafter referred to simply as a surface temperature of a second raceway portion in the description of Examples and Comparative Examples) t2 of a portion where the second raceway portion was formed set to 240° C., and with a temperature (hereinafter referred to simply as an internal temperature in the description of Examples and Comparative Examples) t3 of a portion becoming an inner layer part set to 542° C.

The tempering treatment was performed with the workpiece that had been subjected to the quenching treatment immersed in water (a cooling liquid) of 25° C. In this case, the cooling water was jetted from the jet nozzles 106 at a flow rate of 10 L/min at the same time as initiation of heating.

The surface temperature t1 of the first raceway portion was measured in the middle (see P of FIG. 2) of a surface of the first raceway portion in an axial direction. The surface temperature t2 of the second raceway portion was measured in the middle (see Q of FIG. 2) of a surface of the second raceway portion in the axial direction. The internal temperature t3 was measured at a position (see R of FIG. 2) located at a half of a wall thickness toward an inner side in a radial direction from the middle of the raceway surface in the axial direction in a cutting surface (see FIG. 2) obtained when the workpiece was cut in the radial direction.

Examples 2 to 8

Test pieces of the inner rings were obtained in the same way as in Example 1 except that conditions (a frequency and output) of induction heating in the event of tempering and the flow rate of the cooling water jetted from the jet nozzles 106 were changed as shown in Table 1.

The tempering temperatures (the surface temperature t1 of the first raceway portion, the surface temperature t2 of the second raceway portion, and the internal temperature t3) in each of the examples were as shown in Table 1.

Comparative Example 1

Figure 8:
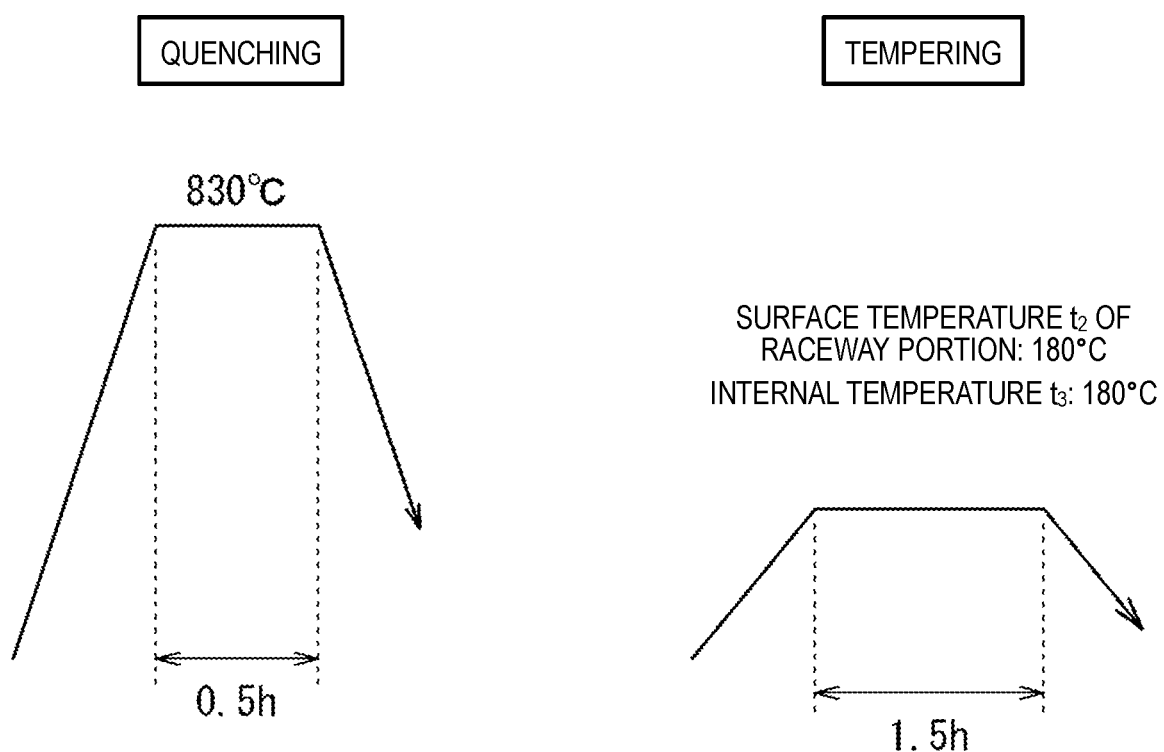
FIG. 8 is a line diagram illustrating heat treatment conditions in Comparative Example 1.

Tempering treatment was performed using a tempering furnace, and a test piece of the inner ring was obtained in the same way as in Example 1 except that conditions of the tempering treatment were set to conditions illustrated in FIG. 8.

FIG. 8 is a line diagram illustrating heat treatment conditions in Comparative Example 1. In Comparative Example 1, the workpiece was heated at 830° C. for 0.5 hour to be quenched in whole, and then was oil-cooled to 80° C. Afterward, the workpiece was heated at 180° C. (180° C. to both the surface temperature t2 of the raceway portion and the internal temperature t3) for 1.5 hours to be tempered.

The surface temperature of the raceway portion was measured in the same place as the surface temperature of the second raceway portion of Example 1.

Comparative Example 2

A workpiece for the inner ring formed of SUJ2 was obtained in the same way as in Example 1.

Figure 9:
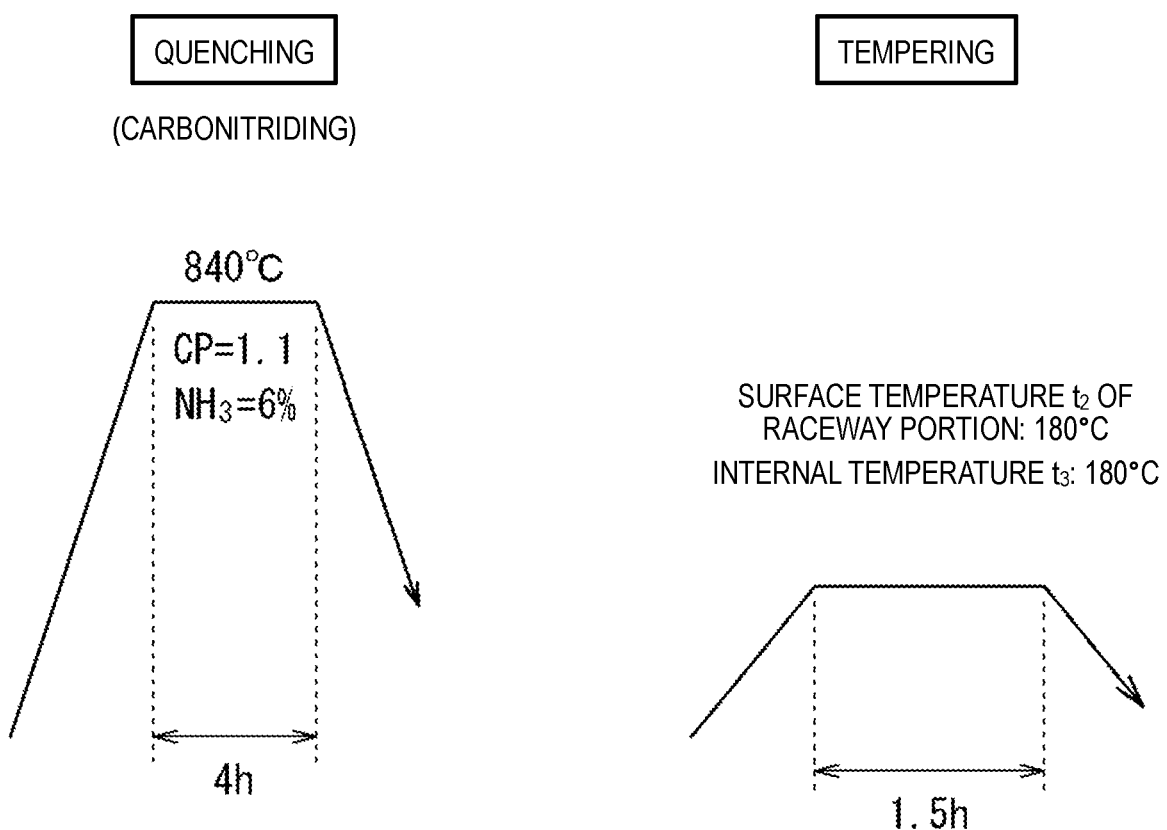
FIG. 9 is a line diagram illustrating heat treatment conditions in Comparative Example 2.

Next, carbonitriding quenching treatment was performed on the obtained workpiece in a carbonitriding atmosphere in which a carbon potential was 1.1 and an ammonia gas concentration was 6 vol % according to heat treatment conditions illustrated in FIG. 9. Afterward, the same tempering treatment as in Comparative Example 1 was performed, and a polishing process was performed. Thereby, a test piece of the inner ring for a bearing (having a model number of TRA0607) was obtained.

FIG. 9 is a line diagram illustrating heat treatment conditions in Comparative Example 2. In Comparative Example 2, the workpiece was heated at 840° C. for 4 hours, was subjected to carbonitriding quenching, and then was oil-cooled to 80° C. Afterward, the workpiece was heated and tempered at 180° C. for 1.5 hours.

Comparative Example 3

An annular blank was manufactured from a steel material formed of Society of Automotive Engineers (SAE) 5120. The obtained annular blank was subjected to a cutting process to have a predetermined shape, and a workpiece (having an outer diameter of 53 mm and a maximum wall thickness x of 12.0 mm) for the inner ring was obtained. Next, the obtained workpiece was subjected to carburizing quenching treatment in an atmosphere in which a carbon potential was 1.1 under heat treatment conditions illustrated in FIG. 10. Afterward, the workpiece was subjected to the same tempering treatment as in Comparative Example 1, and then a polishing process, and a test piece of the inner ring for a bearing (having a model number of TRA0607) was obtained.

Figure 10:
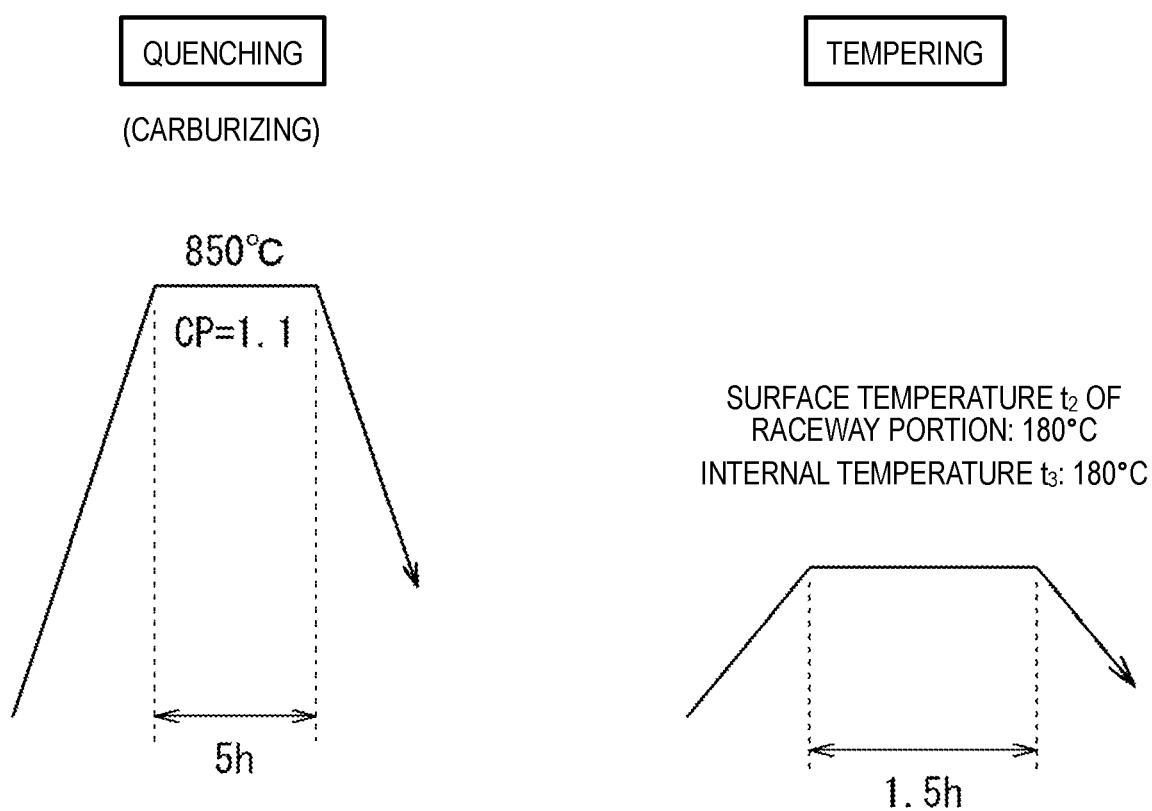
FIG. 10 is a line diagram illustrating heat treatment conditions in Comparative Example 3.

FIG. 10 is a line diagram illustrating heat treatment conditions in Comparative Example 3. In Comparative Example 3, the workpiece was heated at 850° C. for 5 hours, was subjected to carburizing quenching, and then was oil-cooled to 80° C. Afterward, the workpiece was heated at 180° C. for 1.5 hours to be tempered.

Comparative Example 4

A test piece of the inner ring was obtained in the same way as in Example 1 except that conditions (a frequency and output) of induction heating in the event of tempering treatment were changed as shown in Table 2 and jetting of cooling water using the jet nozzles 106 was not performed.

Figure 11:
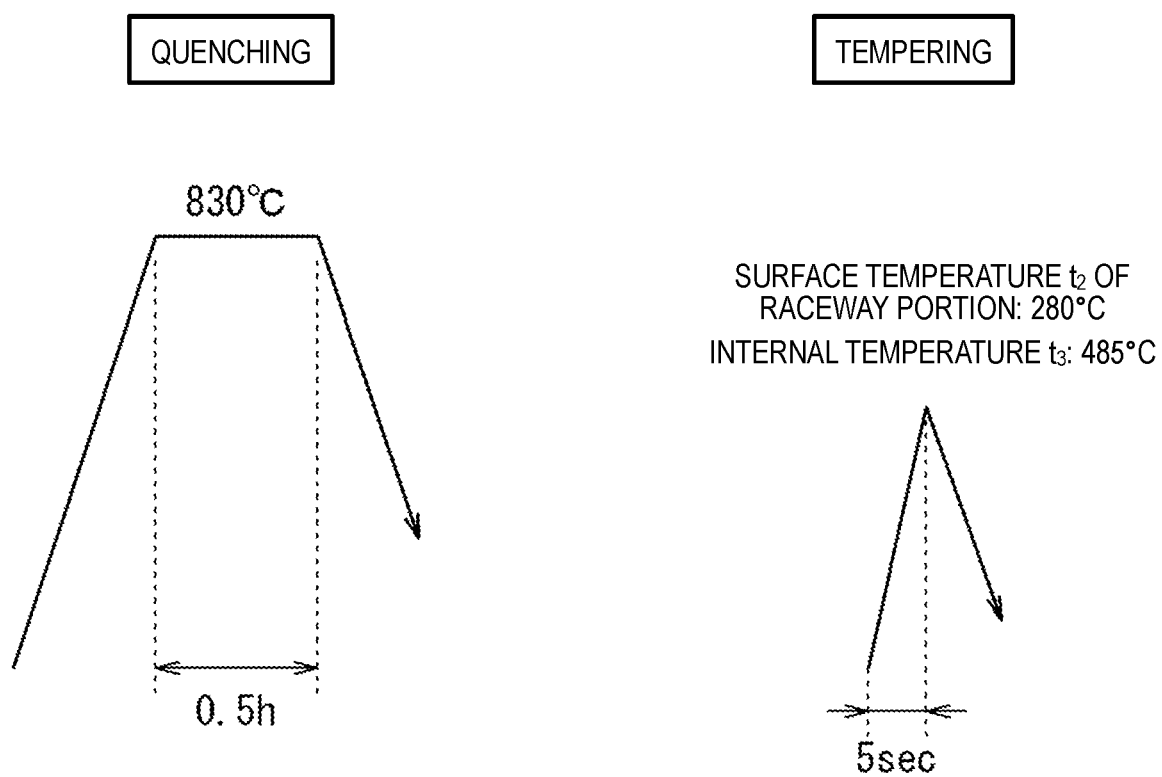
FIG. 11 is a line diagram illustrating heat treatment conditions in Comparative Example 4.

FIG. 11 is a line diagram illustrating heat treatment conditions in Comparative Example 4. In Comparative Example 4, the workpiece was heated at 830° C. for 0.5 hour, was quenched in whole, and then was oil-cooled to 80° C. Afterward, the workpiece was set inside the heat treatment apparatus 100, was subjected to induction heating at a frequency of 1210 Hz with output of 200 kW for 5 seconds while being immersed in a cooling liquid without supplying the cooling water via the jet nozzles 106, and was tempered with a surface temperature (simply referred to as a surface temperature of a raceway portion in the description of Examples and Comparative Examples) t2 of a portion where a raceway portion was formed set to 280° C. and with an internal temperature t3 set to 485° C. The surface temperature of the raceway portion was measured in the same place as the surface temperature of the second raceway portion of Example 1.

Comparative Examples 5 to 11

Test pieces of the inner rings were obtained in the same way as in Comparative Example 4 except that conditions (a frequency and output) of induction heating in the event of tempering treatment were changed as shown in Table 2.

The tempering temperatures (the surface temperature t2 of the raceway portion and the internal temperature t3) in each of the comparative examples were as shown in Table 2.

Comparative Examples 12 to 15

Test pieces of the inner rings were obtained in the same way as in Example 1 except that conditions (a frequency and output) of induction heating in the event of tempering treatment and a flow rate of cooling water jetted from the jet nozzles 106 were changed as shown in Table 2.

The tempering temperatures (the surface temperature t1 of the first raceway portion, the surface temperature t2 of the second raceway portion, and the internal temperature t3) in each of the comparative examples were as shown in Table 2.

TABLE 1

| | | | | | Tempering Conditions | | | |
| | Type of Steel | Heat Treatment | Quenching Conditions | Frequency (Hz) | Output (kW) | Surface Temperature of Raceway Portion (Second Raceway Portion) (° C.) | Surface Temperature of First Raceway Portion (° C.) | Internal Temperature (° C.) | Flow Rate of Cooling Liquid caused by Jetting (L/min) |
|---|---|---|---|---|---|---|---|---|---|
| Example 1 | SUJ2 | Quenching Tempering | 830° C.-0.5 h | 1560 | 185 | 240° C.-5 sec | 253° C.-5 sec | 542° C.-5 sec | 10 |
| Example 2 | SUJ2 | Quenching Tempering | 830° C.-0.5 h | 430 | 210 | 235° C.-5 sec | 199° C.-5 sec | 478° C.-5 sec | 10 |
| Example 3 | SUJ2 | Quenching Tempering | 830° C.-0.5 h | 430 | 240 | 210° C.-5 sec | 165° C.-5 sec | 550° C.-5 sec | 20 |

TABLE 1-continued

| | Type of Steel | Heat Treatment | Quenching Conditions | Tempering Conditions | | | | | |
|---|---|---|---|---|---|---|---|---|---|
| | | | | Frequency (Hz) | Output (kW) | Surface Temperature of Raceway Portion (Second Raceway Portion) (° C.) | Surface Temperature of First Raceway Portion (° C.) | Internal Temperature (° C.) | Flow Rate of Cooling Liquid caused by Jetting (L/min) |
| Example 4 | SUJ2 | Quenching Tempering | 830° C.-0.5 h | 430 | 210 | 215° C.-5 sec | 168° C.-5 sec | 460° C.-5 sec | 20 |
| Example 5 | SUJ2 | Quenching Tempering | 830° C.-0.5 h | 430 | 210 | 195° C.-5 sec | 146° C.-5 sec | 475° C.-5 sec | 40 |
| Example 6 | SUJ2 | Quenching Tempering | 830° C.-0.5 h | 430 | 210 | 180° C.-5 sec | 135° C.-5 sec | 470° C.-5 sec | 60 |
| Example 7 | SUJ2 | Quenching Tempering | 830° C.-0.5 h | 1560 | 195 | 249° C.-5 sec | 279° C.-5 sec | 553° C.-5 sec | 10 |
| Example 8 | SUJ2 | Quenching Tempering | 830° C.-0.5 h | 580 | 200 | 210° C.-5 sec | 165° C.-5 sec | 470° C.-5 sec | 20 |

TABLE 2

| | Type of Steel | Heat Treatment | Quenching Conditions | Tempering Conditions | | | | | |
|---|---|---|---|---|---|---|---|---|---|
| | | | | Frequency (Hz) | Output (kW) | Surface Temperature of Raceway Portion (Second Raceway Portion) (° C.) | Surface Temperature of First Raceway Portion (° C.) | Internal temperature (° C.) | Flow Rate of Cooling Liquid caused by Jetting (L/min) |
| Comparative Example 1 | SUJ2 | Quenching Tempering | 830° C.-0.5 h | — | — | 180° C.-1.5 h | — | 180° C.-1.5 h | — |
| Comparative Example 2 | SUJ2 | Carbonitriding Quenching Tempering | 840° C.-4 h | — | — | 180° C.-1.5 h | — | 180° C.-1.5 h | — |
| Comparative Example 3 | SAE5120 | Carburizing Quenching Tempering | 850° C.-5 h | — | — | 180° C.-1.5 h | — | 180° C.-1.5 h | — |
| Comparative Example 4 | SUJ2 | Quenching Tempering | 830° C.-0.5 h | | 200 | 280° C.-5 sec | — | 480° C.-5 sec | 0 |
| Comparative Example 5 | SUJ2 | Quenching Tempering | 830° C.-0.5 h | 430 | 202 | 120° C.-5 sec | — | 485° C.-5 sec | 0 |
| Comparative Example 6 | SUJ2 | Quenching Tempering | 830° C.-0.5 h | 1210 | 210 | 255° C.-5 sec | — | 565° C.-5 sec | 0 |
| Comparative Example 7 | SUJ2 | Quenching Tempering | 830° C.-0.5 h | 1210 | 190 | 255° C.-5 sec | — | 405° C.-5 sec | 0 |
| Comparative Example 8 | SUJ2 | Quenching Tempering | 830° C.-0.5 h | 1210 | 140 | 220° C.-5 sec | — | 370° C.-5 sec | 0 |
| Comparative Example 9 | SUJ2 | Quenching Tempering | 830° C.-0.5 h | 1210 | 215 | 220° C.-5 sec | — | 575° C.-5 sec | 0 |
| Comparative Example 10 | SUJ2 | Quenching Tempering | 830° C.-0.5 h | 1210 | 210 | 220° C.-5 sec | — | 485° C.-5 sec | 0 |
| Comparative Example 11 | SUJ2 | Quenching Tempering | 830° C.-0.5 h | 1560 | 140 | 220° C.-5 sec | — | 480° C.-5 sec | 0 |
| Comparative Example 12 | SUJ2 | Quenching Tempering | 830° C.-0.5 h | 1560 | 175 | 249° C.-5 sec | 249° C.-5 sec | 580° C.-5 sec | 10 |
| Comparative Example 13 | SUJ2 | Quenching Tempering | 830° C.-0.5 h | 580 | 195 | 210° C.-5 sec | 165° C.-5 sec | 550° C.-5 sec | 20 |
| Comparative Example 14 | SUJ2 | Quenching Tempering | 830° C.-0.5 h | 580 | 210 | 205° C.-5 sec | 160° C.-5 sec | 545° C.-5 sec | 40 |
| Comparative Example 15 | SUJ2 | Quenching Tempering | 830° C.-0.5 h | 580 | 190 | 190° C.-5 sec | 135° C.-5 sec | 410° C.-5 sec | 40 |

(Evaluation of Test Pieces)

Distribution of hardness of cross sections in the test pieces of the inner rings of Examples 1 to 8 and Comparative Examples 1 to 15 was obtained using a Vickers hardness testing machine. In measuring the distribution of hardness of cross sections, it was found that the Vickers hardness of the cross section of the surface layer part in the test pieces of the examples is gradually reduced from the outermost surface toward the inner layer part. This distribution of hardness was also used to calculate a depth of a high hardness surface layer to be described below.

Vickers hardness, hardness of the inner layer part, a depth of the high hardness surface layer, compressive residual stress, a rolling fatigue life, a Charpy impact value, crushing strength, and manufacturing costs on each of surfaces of the raceway portions (the first raceway portion and the second raceway portion) of the test pieces of the inner rings of Examples 1 to 8 and Comparative Examples 1 to 15 were checked. Furthermore, structures of the outer and inner layer parts of the test pieces of the inner rings of Examples 1 to 8 and Comparative Examples 1 to 15 were observed by an optical microscope.

Vickers hardness of the surfaces of the raceway portions was measured by striking a Vickers indenter onto the middles in axial directions of the surfaces of the raceway portions (the first raceway portion and the second raceway portion) of the test piece of each of the inner rings.

Hardness of the inner layer part was the hardness measured by striking the Vickers indenter at a position located at a half of a wall thickness toward an inner side in a radial direction from the middle of the raceway surface in the axial direction in a cutting surface (see FIG. 2) obtained when the test piece of each of the inner rings was cut in the radial direction. A maximum shear stress depth was calculated by a Hertz contact theory, and the depth of the high hardness surface layer is calculated based on the maximum shear stress depth and the above-described distribution of the Vickers hardness. The compressive residual stress was measured by performing an X-ray diffraction method using a residual stress measuring device.

The rolling fatigue life was measured by performing a radial type rolling fatigue life test.

The Charpy impact value was measured according to JIS K7111-1.

The crushing strength was measured by deforming and destroying the test piece, and evaluating a radial load when the test piece is destroyed by interposing a first place of the test piece of the inner ring in a circumferential direction and a second place that was a place moved from the first place in the circumferential direction by 180° C. in an Amsler testing machine in a radial direction and moving the first place and the second place to approach each other at a speed of 0.5 mm/min in a direction perpendicular to an axis of the test piece and joining the first place and the second place.

These results are shown in Tables 3 and 4. The rolling fatigue life, the Charpy impact value, and the crushing strength are calculated as relative values with respect to the measured value of Comparative Example 1. Further, a circle mark in the cost of the table refers to a numerical value that is equal to or lower than an evaluated numerical value of the inner ring of Comparative Example 1, and a cross mark refers to a numerical value that is greater than the evaluated numerical value of the inner ring of Comparative Example 1.

TABLE 3

| | Main Structure of Surface Layer Part | Main Structure of Inner Layer Part | Surface Hardness (HV) | | Hardness of Inner Layer Part (HV) | Depth of High Hardness Surface Layer | |
|---|---|---|---|---|---|---|---|
| | | | Second Raceway Portion | First Raceway Portion | | Second Raceway Portion | First Raceway Portion |
| Example 1 | High Carbon Martensite | Low Carbon Martensite | 729 | 745 | 458 | 3.3Z0 | 3.4Z0 |
| Example 2 | High Carbon Martensite | Low Carbon Martensite | 729 | 745 | 538 | 4.0Z0 | 4.1Z0 |
| Example 3 | High Carbon Martensite | Low Carbon Martensite | 729 | 766 | 459 | 3.6Z0 | 3.7Z0 |
| Example 4 | High Carbon Martensite | Low Carbon Martensite | 749 | 766 | 535 | 4.8Z0 | 5.1Z0 |
| Example 5 | High Carbon Martensite | Low Carbon Martensite | 752 | 780 | 540 | 4.6Z0 | 4.8Z0 |
| Example 6 | High Carbon Martensite | Low Carbon Martensite | 760 | 798 | 538 | 4.7Z0 | 4.9Z0 |
| Example 7 | High Carbon Martensite | Low Carbon Martensite | 745 | 765 | 507 | 3.0Z0 | 3.1Z0 |
| Example 8 | High Carbon Martensite | Low Carbon Martensite | 735 | 755 | 510 | 4.4Z0 | 4.7Z0 |

| | Compressive Residual Stress (MPa) | | Rolling Fatigue Life (Relative Value) | Charpy Impact Value (Relative Value) | Crushing Strength (Relative Value) | Cost |
|---|---|---|---|---|---|---|
| | Second Raceway Portion | First Raceway Portion | | | | |
| Example 1 | 238 | 265 | 1.21 | 1.10 | 1.00 | ○ |
| Example 2 | 212 | 255 | 1.20 | 1.00 | 1.00 | ○ |
| Example 3 | 276 | 315 | 1.21 | 1.00 | 1.00 | ○ |
| Example 4 | 256 | 300 | 1.24 | 1.00 | 1.00 | ○ |
| Example 5 | 301 | 320 | 1.35 | 1.00 | 1.10 | ○ |
| Example 6 | 317 | 350 | 1.50 | 1.00 | 1.10 | ○ |
| Example 7 | 220 | 240 | 1.18 | 1.00 | 1.00 | ○ |
| Example 8 | 221 | 241 | 1.18 | 1.00 | 1.00 | ○ |

TABLE 4

| | Main Structure of Surface Layer Part | Main Structure of Inner Layer Part | Surface Hardness (HV) Second Raceway Portion | Surface Hardness (HV) First Raceway Portion | Hardness of Inner Layer Part (HV) | Depth of High Hardness Surface Layer Second Raceway Portion | Depth of High Hardness Surface Layer First Raceway Portion | Compressive Residual Stress (MPa) Second Raceway Portion | Compressive Residual Stress (MPa) First Raceway Portion | Rolling Fatigue Life (Relative Value) | Charpy Impact Value (Relative Value) | Crushing Strength (Relative Value) | Cost |
|---|---|---|---|---|---|---|---|---|---|---|---|---|---|
| Comparative Example 1 | High Carbon Martensite | High Carbon Martensite | 740 | — | 740 | — | — | 0 | 0 | 1.00 | 1.00 | 1.00 | ○ |
| Comparative Example 2 | High Carbon Martensite | High Carbon Martensite | 783 | — | 782 | — | — | 0 | 0 | 1.20 | 1.00 | 1.20 | x |
| Comparative Example 3 | High Carbon Martensite | Low Carbon Martensite | 753 | — | 550 | 6.3Z0 | ← | 207 | — | 1.00 | 2.00 | 0.80 | x |
| Comparative Example 4 | High Carbon Martensite | Low Carbon Martensite | 681 | — | 540 | 3.1Z0 | 3.2Z0 | 182 | — | 0.80 | 1.20 | 1.00 | ○ |
| Comparative Example 5 | High Carbon Martensite | Low Carbon Martensite | 854 | — | 535 | 7.4Z0 | 7.8Z0 | 241 | — | 1.00 | 0.80 | 1.00 | ○ |
| Comparative Example 6 | High Carbon Martensite | Low Carbon Martensite | 735 | — | 412 | 3.1Z0 | 3.2Z0 | 182 | — | 1.00 | 1.20 | 0.80 | ○ |
| Comparative Example 7 | High Carbon Martensite | Low Carbon Martensite | 739 | — | 555 | 5.3Z0 | 5.4Z0 | 169 | — | 1.00 | 0.97 | 1.00 | ○ |
| Comparative Example 8 | High Carbon Martensite | Low Carbon Martensite | 742 | — | 589 | 5.8Z0 | 5.9Z0 | 165 | — | 1.00 | 0.87 | 1.00 | ○ |
| Comparative Example 9 | High Carbon Martensite | Low Carbon Martensite | 722 | — | 435 | 1.4Z0 | 1.7Z0 | 184 | — | 0.80 | 1.10 | 0.90 | ○ |
| Comparative Example 10 | High Carbon Martensite | Low Carbon Martensite | 788 | — | 542 | 4.6Z0 | 9.8Z0 | 180 | — | 1.00 | 0.70 | 1.00 | ○ |
| Comparative Example 11 | High Carbon Martensite | Low Carbon Martensite | 721 | — | 540 | 3.8Z0 | 3.9Z0 | 180 | — | 1.10 | 1.00 | 1.00 | ○ |
| Comparative Example 12 | High Carbon Martensite | Low Carbon Martensite | 729 | 745 | 439 | 3.0Z0 | 3.1Z0 | 242 | 276 | 1.20 | 1.10 | 0.90 | ○ |
| Comparative Example 13 | High Carbon Martensite | Low Carbon Martensite | 719 | 766 | 435 | 3.4Z0 | 3.7Z0 | 276 | 310 | 1.20 | 1.10 | 0.80 | ○ |
| Comparative Example 14 | High Carbon Martensite | Low Carbon Martensite | 722 | 760 | 431 | 3.2Z0 | 3.4Z0 | 321 | 345 | 1.25 | 1.10 | 0.80 | ○ |
| Comparative Example 15 | High Carbon Martensite | Low Carbon Martensite | 765 | 790 | 565 | 6.4Z0 | 6.7Z0 | 289 | 301 | 1.30 | 0.90 | 1.00 | ○ |

It was found from the results shown in Tables 3 and 4 that the bearing ring for a roller bearing (Examples 1 to 8) could achieve an excellent rolling fatigue life compared to the test piece (Comparative Example 1) made by the conventional method, where the bearing ring for a roller bearing (Examples 1 to 8) including: the inner layer part formed of tempering martensite and having Vickers hardness of 450 HVV or more and less than 550 HVV and the surface layer part which surrounded the inner layer part, having Vickers hardness of 700 HVV or more and less than 800 HVV at the surface of the surface layer part, and formed of tempering martensite, wherein the raceway portion includes the first raceway portion where compressive residual stress is locally high.

It was found that by setting the compressive residual stress of the first raceway portion to 250 MPa or more, it was possible to provide a bearing ring for a roller bearing which had the same rolling fatigue life as the bearing ring for a roller bearing subjected to a carbonitriding process and which was manufactured at a low cost.

Furthermore, it was found that by setting the compressive residual stress of the first raceway portion to 320 MPa or more, it was possible to achieve an especially excellent rolling fatigue life.

It was found from these configurations that, according to the embodiment of the present invention, the roller bearing (the bearing ring for a roller bearing) having an excellent rolling fatigue life could be provided at a low cost.

This application is based on Japanese Patent Application No. 2016-075753, filed on Apr. 5, 2016, the contents of which are incorporated herein by reference.

DESCRIPTION OF REFERENCE SIGNS

1: Tapered roller bearing
10: Inner ring
11: Inner ring raceway surface
12: Inner circumferential surface
13: Lateral surface
14: Surface layer part
15: Inner layer part
16: Raceway portion
16A: First raceway portion
16B: Second raceway portion
17A, 17B: Nonraceway portion
18: Collar part
20: Outer ring
21: Outer ring raceway surface
30: Tapered roller
31: Rolling contact surface
31a, 31b: Edge portion
32, 33: Roller end face
40: Cage
100, 200: Heat treatment apparatus
101: Treatment tank
101A: Inner case
101B: Outer case
102: Holding jig
103: Induction heating coil
104: Center core
105: Cooling liquid
106, 206: Jet nozzles
107A, 107B: Supply pipe
108: Drain
W1: Annular blank
W2: Pre-form (workpiece)
W3: Intermediate blank

The invention claimed is:

1. A bearing ring for a roller bearing having an annular shape and being formed of high carbon chromium bearing steel, the bearing ring comprising:
  an inner layer part formed of tempered martensite or sorbite and having a Vickers hardness of 450 HV or more and less than 550 HV; and
  a surface layer part surrounding an entire periphery of the inner layer part, the surface layer part having a Vickers hardness of 700 HV or more and less than 800 HV at a surface of the surface layer part, and being formed of tempered martensite, wherein:
  the surface layer part includes a raceway portion having a raceway surface that is in rolling contact with a roller and a nonraceway portion other than the raceway portion,
  the raceway portion includes a first raceway portion at which compressive residual stress of the raceway surface is 250 MPa or more, and a second raceway portion at which the compressive residual stress is lower than that of the first raceway portion, and
  the raceway surface of the first raceway portion includes a portion that is in contact with an axial end of a rolling contact surface of the roller.

2. The bearing ring according to claim 1, wherein the compressive residual stress of the raceway surface of the first raceway portion is 320 MPa or more.

3. A method for manufacturing a bearing ring, the method comprising:
  (A) a process of performing quenching treatment on an annular workpiece formed of high carbon chromium bearing steel;
  (B) a process of performing tempering treatment on the workpiece on which the quenching treatment has been performed, and immersing the entire workpiece in a cooling liquid, and heating the workpiece; and
  (C) a process of performing a finishing process on the workpiece on which the tempering treatment has been performed, wherein
  the process (B) is performed in a state in which a flow of the cooling liquid is generated in the cooling liquid in which the workpiece on which the quenching treatment has been performed is immersed such that the cooling liquid is concentrated on a portion at which the first raceway portion of the workpiece is formed, wherein:
  the bearing ring includes:
    an inner layer part formed of tempered martensite or sorbite and having a Vickers hardness of 450 HV or more and less than 550 HV, and
    a surface layer part surrounding an entire periphery of the inner layer part, the surface layer part having a Vickers hardness of 700 HV or more and less than 800 HV at a surface of the surface layer part, and being formed of tempered martensite;
  the surface layer part includes a raceway portion having a raceway surface that is in rolling contact with a roller and a nonraceway portion other than the raceway portion;
  the raceway portion includes a first raceway portion at which compressive residual stress of the raceway surface is 250 MPa or more, and a second raceway portion at which the compressive residual stress is lower than that of the first raceway portion; and
  the raceway surface of the first raceway portion includes a portion that is in contact with an axial end of a rolling contact surface of the roller.

4. The method for manufacturing a bearing ring for a roller according to claim 3, wherein
in the process (B), the cooling liquid is output via a jet nozzle, and
a jet port of the jet nozzle faces the portion at which the first raceway portion is formed, and the cooling liquid is output from the jet port toward the portion at which the first raceway portion is formed.

5. A roller bearing comprising:
an inner ring having a raceway portion on an outer circumferential surface thereof;
an outer ring having a raceway portion on an inner circumferential surface thereof; and
a plurality of rollers disposed between the raceway portions of the inner and outer rings, wherein
at least one of the inner ring and the outer ring is the bearing ring according to claim 1.

* * * * *